Nov. 26, 1957 R. J. KUTZLER 2,814,688
CONDITION RESPONSIVE CONTROL DEVICE
Filed April 25, 1955

INVENTOR.
ROBERT J. KUTZLER
BY
*Robert S Craig*
ATTORNEY

United States Patent Office 2,814,688
Patented Nov. 26, 1957

2,814,688

CONDITION RESPONSIVE CONTROL DEVICE

Robert J. Kutzler, St. Louis Park, Minn., assignor to Minneapolis-Honeywell Regulator Company, Minneapolis, Minn., a corporation of Delaware Application April 25, 1955, Serial No. 503,477

9 Claims. (Cl. 200—81.5)

This invention relates to condition responsive control devices and more particularly a control device in which a set schedule of operation is maintained by scheduling one condition with respect to another condition.

One embodiment of my invention has particular utility in the control of guided missiles wherein a scheduled climb is to be maintained to result in optimum performance. Two conditions that can be sensed that will together indicate the climb path of a missile are the altitude and airspeed of the missile. For a scheduled climb path there will be a definite airspeed for each increment of altitude which if maintained by a control means will maintain the scheduled climb path of the missile.

My invention provides this scheduled climb path by utilizing an aneroid bellows to sense altitude and a second bellows to sense airspeed. A member with two conducting surfaces separated by a dielectric portion the shape of which is predetermined for the climb path desired is positioned by the airspeed sensing bellows. The aneroid bellows is positioned at a right angle to the airspeed sensing bellows and positions a wiper that cooperates with the surface of this member. Thus if the wiper is on the dielectric portion the missile is on the scheduled path. If it is to a first side the airspeed is less than required and if to the other side greater than required. This will give a signal dependent on which side of the dielectric the wiper is positioned which can be transmitted to proper control means to correct the condition until the wiper again falls on the dielectric portion. As the missile gains altitude the aneroid bellows changes the position of the wiper in cooperation with the member and a new value of airspeed is called for.

Therefore an object of my invention is to provide a device wherein a predetermined schedule of the relationship of one condition with respect to another condition can be maintained.

Another object of my invention is to provide the monitoring of the climb path of a missile by a condition responsive control device.

Yet another object of my invention is to provide the monitoring of a scheduled relation of values by comparing the conditions effecting these values.

Still another object of my invention is to provide through suitable means the limiting of airspeed with references to altitude.

Further objects of my invention will become evident upon inspection of the following drawings, specification and claims.

Figure 1:
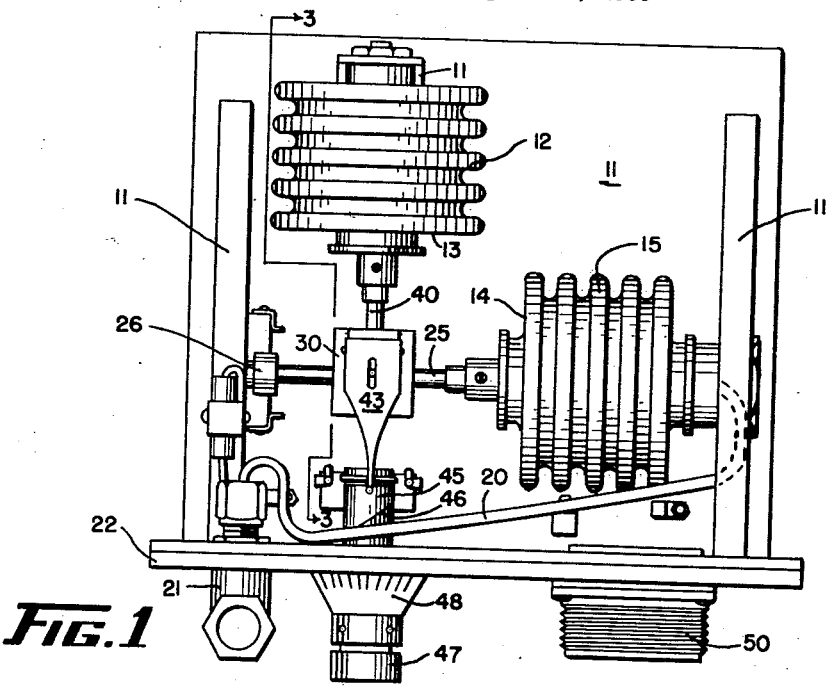
Figure 1 is a plan view seen from the top view of an embodiment of my invention with cover removed.
Figure 2:
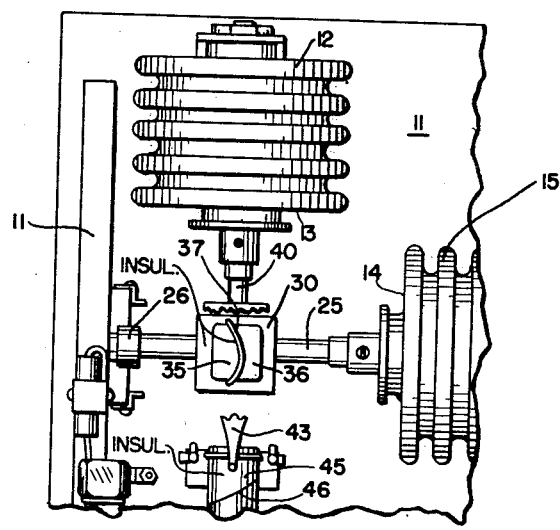
Figure 2 is a fragmentary view similar to Figure 1 with portions removed to show the contact strip.

In the drawings the device is mounted in a sealed casing comprising a cover (not shown) and a frame 11 which supports the component parts. An aneroid bellows 12 is mounted on the frame 11 such that its free end 13 upon movement will move normal to movement of the free end 14 of a bellows 15 also mounted on frame 11.

A Pitot tube or other standard ram and atmospheric pressure sensing device can be used to supply the pressures necessary for comparison of the desired conditions by the subject device. The ram or airspeed pressure is applied to the interior of bellows 15 through pressure supply line 20 attached to pressure connection 21 in the panel 22 forming a part of the casing. The atmospheric pressure is applied to the interior of the sealed casing through suitable pressure connections and tubing (not shown). The bellows 12 being evacuated is thereby positioned by the atmospheric pressure in the casing.

Upon a change in altitude the movable end 13 of aneroid bellows 12 will move to a new position indicative of altitude and upon a change in airspeed the movable end 14 of bellows 15 will move to a new position indicative of airspeed.

A shaft 25 attached to the movable end 14 of bellows 15 and guided in the frame 11 on a member 26 carries a dielectric block 30. Contact strips 35 and 36 are attached to the surface of dielectric block 30 and are separated by a dielectric member 37 attached to the surface of block 30.

Figure 3:
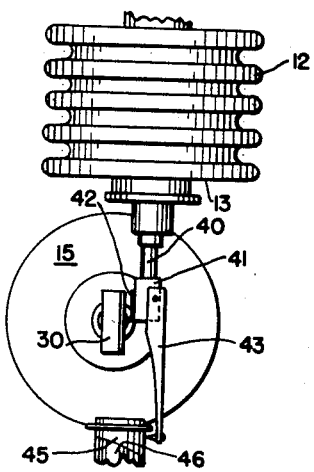
Figure 3 is a fragmentary view taken along line 3—3 in Figure 1 to show the cooperation of the wipers with the contact strips.

A shaft 40 is attached to the movable end 13 of bellows 12 and carries a dielectric member 41 as best seen in Figure 3. The wipers 42 and 43 are separately attached to dielectric member 41 and positioned by bellows 12.

The wiper 42 cooperates with the contact strips 35 and 36 and dielectric member 37 on block 30. The wiper 42 and contact strips 35 and 36 are so arranged electrically that an electrical signal will result indicating which contact strip wiper 42 is cooperating with and naturally no electrical signal will be given when wiper 42 is cooperating with dielectric member 37.

The shape of dielectric member 37 separating contact strips 35 and 36 is predetermined and will be dependent on the desired relationship between airspeed and altitude. The desired relationship occurs when the wiper 42 cooperates with the member 37. When the wiper 42 cooperates with contact strip 35 the airspeed is less than that desired for the existing altitude and an electrical signal is given which may be applied to a control means to correct the conditions until they are again as desired and likewise when the wiper 42 cooperates with the contact strip 36 the airspeed is greater than that desired for the existing altitude and again an electrical signal will indicate the necessary correction until the conditions are again as desired.

A dielectric drum 45 is rotatably mounted on panel 22 such that its surface cooperates with wiper 43. Attached to drum 45 is a helical contact strip 46. Drum 45 can be rotated by knob 47 with indicia of altitude 48 thereon. Wiper 43 is positioned by altitude responsive bellows 12 and will cooperate with contact strip 46 at the altitude indicated by the indicia 48 on knob 47. Wiper 43 and contact strip 46 on drum 45 therefore constituting an altitude switch which will disengage or actuate the device as desired.

A supplementary altitude switch can be used to introduce the device into the control system of the missile after the missile has reached a predetermined altitude and/or airspeed as the conditions at the start of a scheduled climb may be such that the device would be inoperable.

The electrical connections (not shown) of the wipers and contact strips can be brought out of the casing through a standard connector 50 in panel 22 and thence to a control means.

The embodiment described has particular utility as a climb monitor for a guided missile, though I do not intend to limit my invention to the embodiment shown nor to the use in guided missiles but to limit my invention only as defined in the appended claims.

I claim as my invention:

1. A condition responsive control device comprising a first pressure responsive means, a first member positioned by said first pressure responsive means, a surface of conducting and nonconducting portions of predetermined shape a part of said first member, a second pressure responsive means, a second member positioned by said second pressure responsive means, the translational axis of movement of said second member being substantially normal to the translational axis of movement of said first member, a wiper on said second member in cooperation with said surface of said first member.

2. A condition responsive control device comprising a first pressure responsive means, a first member positioned by said first pressure responsive means, a surface of conducting and nonconducting portions of predetermined shape a part of said first member, a second pressure responsive means, a second member positioned by said second pressure responsive, means, the translational axis of movement of said second member being substantially normal to the translational axis of movement of said first member, a wiper on said second member in cooperation with said surface of said first member, a rotatable member having a cylindrical surface of conducting and nonconducting portions of predetermined shape, a wiper cooperating with said cylindrical surface of said rotatable member on one of said members the translational axis of movement of which is parallel to the rotational axis of said rotatable member.

3. A condition responsive device comprising a first pressure responsive means, a first member positioned by said first pressure responsive means, a second pressure responsive means, a second member positioned by said second pressure responsive means substantially normal to the path of movement of said first member, said first member having a surface with two electrical conducting portions separated by a dielectric portion of predetermined shape, said second member including a wiper in cooperation with the surface of said first member.

4. A condition responsive device comprising a first pressure responsive means, a second pressure responsive means, first and second members in cooperation with each other positioned by said first and second pressure responsive means respectively, said first member having a surface with a dielectric substance separating two conductive surfaces thereon, said dielectric substance having a predetermined shape, said second member carrying an electrical conductor wiper, said wiper contacting the surface of said first member.

5. A condition responsive control device comprising a first condition responsive means, a first member positioned by said first condition responsive means, a plane surface of conducting and nonconducting portions of predetermined shape a part of said first member, a second condition responsive means, a second member positioned by said second condition responsive means, the translational axis of movement of said second member being substantially normal to the translational axis of movement of said first member, a wiper on said second member in cooperation with said plane surface of said first member.

6. In a control device, two pressure sensitive elements arranged so that their lines of action are at an angle to each other, a conducting surface carried by a first of said pressure sensitive elements having an elongated edge portion thereon of predetermined shape, a contacting member carried by the other of said pressure sensitive elements adapted to cooperate with said conducting portion of said surface when the said pressure sensitive elements are in predetermined relation to each other.

7. In a control device, two condition responsive elements, members attached to each of said condition responsive elements arranged so that their lines of motion are at an angle to each other, signal producing means carried by said members comprising electrical contact means adapted to cooperate when the said condition responsive elements are in predetermined relationship.

8. A condition responsive device comprising a pressure sensitive element, a contact arm carried by said pressure sensitive element, a rotatable member having an insulated surface with a strip of conducting material thereon, and means for setting said rotatable member at a predetermined position, said contact arm engaging said rotatable member and moving thereon in response to movement of said pressure sensitive element, said conductive strip engaging said contact arm at a position dependent upon the predetermined position at which said rotatable member is set.

9. In a signal producing device, a cylindrical drum having an insulated surface, a conductive strip helically mounted thereon, a contact arm engaging said cylindrical drum and adapted to move parallel to the axis of rotation of said cylindrical drum, said contact arm making electrical connection with said conductive strip at a position dependent upon the angular displacement of said cylindrical drum, and means for indicating said angular displacement.

References Cited in the file of this patent

UNITED STATES PATENTS

| | | |
|---|---|---|
| 1,195,583 | Henretta | Aug. 12, 1916 |
| 1,769,673 | Blaschke | July 1, 1930 |
| 2,200,657 | Shaw | May 14, 1940 |
| 2,472,230 | Reinschmidt | June 7, 1949 |
| 2,555,990 | Newton | June 5, 1951 |
| 2,686,235 | Leathers | Aug. 10, 1954 |
| 2,742,246 | Mellen | Apr. 17, 1956 |